United States Patent [19]

Kitagawa

[11] Patent Number: 5,685,599
[45] Date of Patent: Nov. 11, 1997

[54] STRUCTURAL MEMBER OF VEHICLE BODY

[75] Inventor: Yuichi Kitagawa, Zushi, Japan

[73] Assignee: Nissan Motor Co., Ltd., Kanagawa-ken, Japan

[21] Appl. No.: 604,638

[22] Filed: Feb. 21, 1996

[30] Foreign Application Priority Data

Mar. 3, 1995 [JP] Japan ................. 7-044253

[51] Int. Cl.$^6$ ................................. B60R 21/00
[52] U.S. Cl. ................. 296/204; 296/194; 280/784
[58] Field of Search .............. 296/188, 189, 296/204, 209, 194, 35.1, 35.2, 35.3; 280/784

[56] References Cited

U.S. PATENT DOCUMENTS

| | | | |
|---|---|---|---|
| 2,964,331 | 12/1960 | Sherman | 280/106 |
| 3,073,647 | 1/1963 | Beltz | 296/28 |
| 3,108,836 | 10/1963 | Deckert | 296/28 |
| 3,547,463 | 12/1970 | Eggert, Jr. | 280/106 |
| 3,791,472 | 2/1974 | Tatsumi | 180/64 R |
| 3,848,886 | 11/1974 | Feustel et al. | 280/106 R |
| 3,869,017 | 3/1975 | Feustel et al. | 180/82 R |
| 3,881,742 | 5/1975 | Felzer | 280/106 R |
| 3,912,295 | 10/1975 | Eggert, Jr. | 280/106 R |
| 4,106,807 | 8/1978 | Sakurai | 296/28 R |
| 4,181,192 | 1/1980 | Danckert | 180/232 |
| 4,469,368 | 9/1984 | Eger | 296/188 |
| 4,557,519 | 12/1985 | Matsuura | 296/204 |
| 4,789,198 | 12/1988 | Ide | 296/192 |
| 4,789,199 | 12/1988 | Komatsu | 296/194 |
| 4,836,321 | 6/1989 | Baumann | 180/232 |
| 5,005,864 | 4/1991 | Chachere | 280/800 |
| 5,048,888 | 9/1991 | Willy et al. | 296/189 |
| 5,074,587 | 12/1991 | Schwede | 280/781 |
| 5,244,248 | 9/1993 | Bovellan | 296/194 |
| 5,372,216 | 12/1994 | Tsuji et al. | 180/274 |
| 5,435,618 | 7/1995 | Sacco et al. | 296/188 |
| 5,454,453 | 10/1995 | Meyer et al. | 180/377 |
| 5,466,005 | 11/1995 | Kohlmeier et al. | 280/781 |
| 5,466,006 | 11/1995 | Neumann | 280/784 |
| 5,472,063 | 12/1995 | Watanabe et al. | 180/274 |
| 5,480,189 | 1/1996 | Davies et al. | 280/797 |
| 5,605,353 | 2/1997 | Moss et al. | 280/784 |

Primary Examiner—David M. Mitchell
Assistant Examiner—Jonathan J. Yun
Attorney, Agent, or Firm—Lowe, Price, LeBlanc & Becker

[57] ABSTRACT

In the structure of a vehicle, torque boxes are provided for coupling extension sideframes and sidesills on right and left sides in the front of the vehicle cabin. The rear end portions of the suspension member are coupled to rear coupling portions provided in the torque boxes, and coupling points for coupling thereat with the suspension member of the rear coupling portions are provided outside in a widthwise direction of the vehicle relative to the center of a section of the extension sideframes, and inside in the car width direction than the center of a section of the sidesills. With this structure, a load to the rearward of the vehicle of the suspension member at the time of a front-end collision and a front-end offset collision of the vehicle can be efficiently dissipated and transmitted to the extension sideframe and the sidesill via the torque box, and any retreat of the suspension member can be suppressed with a light and simple structure.

10 Claims, 9 Drawing Sheets

STRUCTURAL MEMBER OF VEHICLE BODY

BACKGROUND OF THE INVENTION

1. Field of the Invention

The present invention relates to a structural member of a car body which receives the compressive load in the axial direction at the time of a collision of a vehicle.

2. Description of the Related Art

In the conventional structural member of this kind, a power unit comprising an engine, a transmission and the like is supported via mount insulators by front side members on right and left arranged on both sides in the car width direction of an engine room in the front of the vehicle, along the back and forth direction of the vehicle. On the front end portions of the front side members, there is provided a bumper, and on the back end portion thereof, there is provided right and left extension sideframes integrally and continuously which extend from the engine room toward the lower side of the cabin.

In the lower end corner portion of a dash panel, there is connected a center member which forms a closed section between the outer face of the dash panel and itself. The center member is provided along the car width direction and both end portions of the center member run against the side portions of the extension sideframes and connected thereto, and further extend toward outside in the car width direction. Right and left sidesills are provided outside in the car width direction of the extension sideframes. The sidesills are extended to the rearward along the back and forth direction of the vehicle, and the front end portions of the sidesills are connected to the extension sideframes via torque boxes. To the torque box, both end portions of said center member are connected.

In the rear portion of the engine room, a suspension member for supporting a suspension is provided along the car width direction. The front end portion of the suspension member is coupled to a front coupling projected downward of the extension sideframes, and the rear end portion of the suspension member is coupled to a rear coupling provided on the lower face of the center member.

When a vehicle travels, the load input to the suspension is received by the suspension member, which is supported by the extension sideframes.

At the time of a front-end collision of a vehicle, first a bumper receives the load. When such load becomes larger than a predetermined magnitude, the frontside members absorb the load to cause a deformation, and the engine room is crushed. When the engine room is crushed to some extent, the power unit retreats rearward of the vehicle to be brought into contact with the suspension member. Though depending upon the collision state, at the time of a front-end collision with the speed of several tens kilometers an hour, there is a possibility that the load transmitted from the power unit to the suspension member may reach several hundreds kilonewtons.

Since either of the extension sideframes and the sidesills located rearward than the suspension member is a structural member having a closed section arranged in the back and forth direction of the vehicle, the load toward the rear of the vehicle transmitted to the suspension member is dissipated in and absorbed by the extension sideframes and the sidesills. Thereby, the deformation on the lower side of a cabin can be diminished at the time of such a front-end collision.

In such a conventional structural member, however, since a coupling point of the suspension member in the rear coupling portion is located in the center member which is in the inner side in the car width direction than the center of a section (center in the sectional width) of the extension sideframe, the load from the coupling point is input eccentrically toward inside in the car width direction with respect to both the extension sideframe and the sidesill. Therefore, in order to support the suspension member which retreats with a force of several hundreds kilonewtons, the center member, the connecting portion of the center member and the torque box, the connecting portions of the center member and the extension sideframes, and the like have to be reinforced strongly, and the load has to be dissipated efficiently to the extension sideframes and the sidesills, thereby the structure becomes inevitably complicated and heavy.

Furthermore, though it can be considered to provide the coupling point of the rear coupling portion roughly in the center of a section, in such a structure, the load cannot be dissipated directly from the center member via the torque box to the sidesill, and the coupling point is roughly in the center of a section of the extension sideframe to make it difficult for the load to be dissipated from the extension sideframe via the torque box to the sidesill, thereby it is feared that it becomes substantially the same situation as to support the suspension member by only one extension sideframe. Therefore, when it is assumed that large collision load is input, a strong reinforcing structure is required, and thus the structure becomes inevitably complicated and heavy.

Furthermore, at the time of a so-called front-end offset collision in which the collision input is biased to one side of the vehicle, since the power unit comes in contact with the suspension member while rotating, the one coupling point located in the rear end portion on the collision side of the suspension member tends to retreat toward the diagonally rearward direction inside in the car width direction so as to draw an arc, making the other coupling point located in the rear end portion on the non-collision side as a center.

In this case, in the conventional structure in which the coupling point is provided in the center of a section of the extension sideframe or on the inner side in the car width direction than the center thereof, the load to the sidesill is hardly dissipated, therefore, it becomes necessary to support the most part of the load affecting diagonally rearward inside in the car width direction with the flexural strength of one extension sideframe. Therefore, in order to suppress the retreat of the suspension member, it is necessary to increase the flexural rigidity by thickening the extension sideframes and the like, thus the structure inevitably becomes large and heavy.

SUMMARY OF THE INVENTION

The present invention gives attention to these conventional problems, and the main object thereof is to provide a structural member of a car body which can suppress the retreat of the cross frame by means of a light and simple structure.

In order to attain the above object, the structural member of a vehicle body according to the present invention has right and left extension sideframes extending from an engine room, where an engine is installed, to the lower side of the vehicle cabin, right and left sidesills extending outwardly of said extension sideframes rearwardly of the vehicle. A cross frame having two rear end portions arranged is arranged laterally between said right and left extension sideframes. Coupling members for coupling the extension sideframes and the sidesills are provided on right and left sides of a front portion of the cabin, both end portions of said cross frame are coupled to frame coupling portions provided in said extension sideframes, sidesills, or coupling members, and the coupling points of these frame coupling portions with the cross frame are provided in the outside in the car width direction of the center of a section of the extension sideframes laterally inwardly of the center of a section of said sidesills.

As a result, at the time of a front-end collision of a vehicle, when the engine room is crushed to some extent, the engine and the transmission retreat rearward of the vehicle, and they press the cross frame rearward of the vehicle. At this time, since the coupling points of the frame coupling portions of the cross frame are provided outside of the car width than the center of a section of the extension sideframes, and inside in the car width direction of the center of a section of the sidesills, the load imparted to the frame coupling portions is efficiently dissipated and transmitted to the extension sideframes and the sidesills via coupling members.

Furthermore, at the time of a front-end offset collision where the collision is biased to the one end side forward of the vehicle, the deformation is concentrated on the collision side of the engine room, and the engine and the like come in contact with the cross frame while rotating, therefore, the end portion on the collision side of the cross frame retreats inside in the car width direction so as to draw an arc making the coupling point on the non-collision side as a center. Accordingly, the load in the diagonally rearward direction affects the frame coupling portion on the collision side, toward inside in the car width direction, but as at the time of said non-offset collision, the load in the rearward direction of the vehicle imparted to the frame coupling portion is efficiently dissipated and transmitted to the extension sideframes and sidesills via the coupling members. At this time, the sidesill outside in the car width direction of the coupling point on the collsion side receives the load in the flexural direction, but the extension sideframe inside in the car width direction of the coupling point is located on the line of action of the load to share the compressive load, therefore the structure is made comprehensively to have high flexural rigidity by means of the extension sideframes and the sidesills.

Therefore, the load at the time of the front-end collisions including offset collisions can be securely supported by the extension sideframes and sidesills to suppress the retreat of the cross frame with a light and simple structure, without making the structure heavy and complicated by providing a special reinforcing member, thickening the extension sideframes or the like.

Furthermore, said cross frame is a suspension member for supporting the suspension of front wheels of the vehicle, and said coupling members are torque boxes provided below the dash panel which divides said engine room and the calm, and said frame coupling portions may be provided in said torque boxes.

As a result, since the torque box provided for increasing the rigidity of the extension sideframe and the sidesill is used as the coupling member, the structure is made more simple.

Furthermore, at the time of vehicle travelling, the load from the suspension can be more securely supported by the torque box.

Furthermore, said extension sideframe has an upper horizontal portion on said engine room side, a lower horizontal portion on said cabin side and a bending portion which continues from said upper horizontal portion to said lower horizontal portion, and said coupling member couples said lower horizontal portion with the sidesill, and said frame coupling portion may be provided in the lower horizontal portion of said extension sideframe.

As a result, the distance between right and left coupling points can be suppressed to be small, and the moment affecting to the frame coupling portion on the collision side can be suppressed to be low at the time of a front-end offset collision, as well as the coupling points and the coupling members can be provided closely to each other to transmit the load from the coupling points to the coupling members more efficiently, thereby the structure can be made further light.

Furthermore, the coupling point of said frame coupling portion may be provided forward of a vehicle than the rear end of said coupling member.

As a result, the coupling points of the frame coupling portions are provided forward of a vehicle than the rear end of said coupling members, thereby the load in the rearward direction of the vehicle imparted to the frame coupling portions can be dissipated more efficiently to the extension sideframes and the sidesills via the coupling members, thus the structure can be made further light.

Furthermore, said frame coupling portion may be the one having an opposite face which intersects with a longitudinal direction of the car body and opposes the rear side portions of both end portions of said cross frame.

As a result, the retreat of the cross frame is received by the opposite face and the coupling points can be supported by both the strength in the back and forth direction of the extension sideframe and the sectional strength of the opposite face, thereby the retreat of the cross frame can be suppressed also by the opposite face, thus the structure can be made further light.

Furthermore, it is characterized in that a reinforcing member extending diagonally rearward toward the center of the vehicle width is connected in the vicinity of the frame coupling portion of said extension sideframe.

As a result, a reinforcing member extending diagonally rearward toward the center of the car width is connected in the vicinity of the frame coupling portion of the extension sideframes, thereby the load at the time of a front-end collision and a front-end offset collision of a vehicle can be efficiently dissipated to and absorbed by the reinforcing member. Therefore, the retreat of the cross frame can be suppressed even by the reinforcing member, thus the retreat of the cross frame can be made further small.

DETAILED DESCRIPTION OF THE PREFERRED EMBODIMENTS

The first preferred embodiment of the structural member of a car body according to claim 1, claim 2 or claim 4 will now be described with reference to the accompanying drawings.

Figure 1:
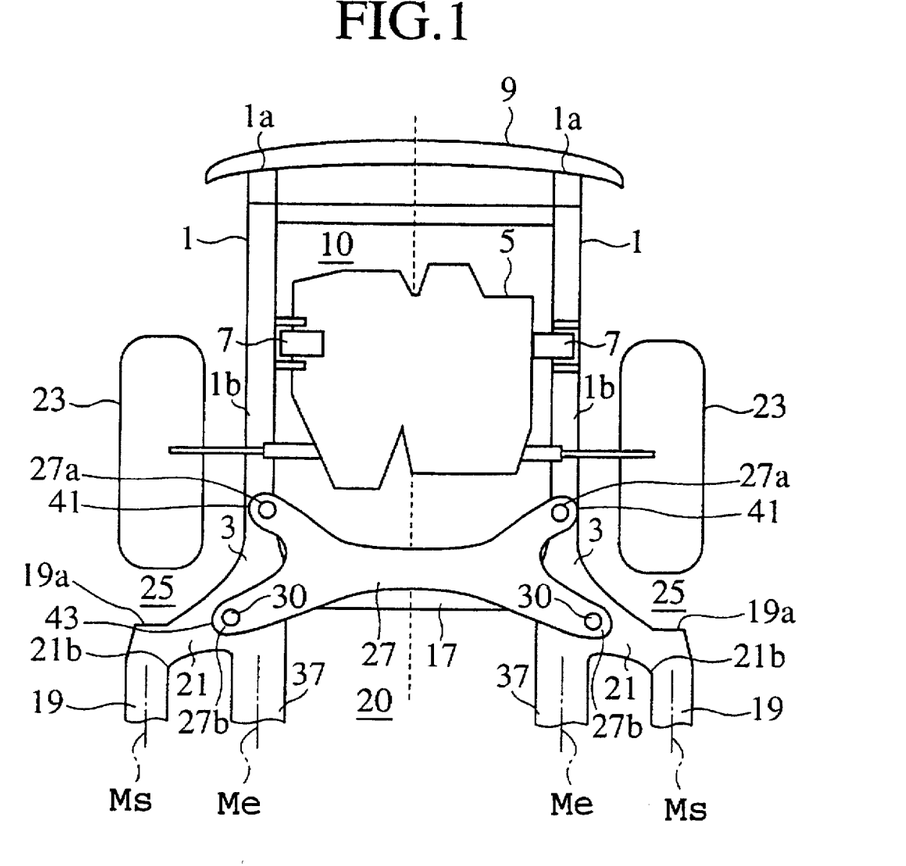
FIG. 1 is a bottom view of a vehicle having a structural member according to the first embodiment.
Figure 2:
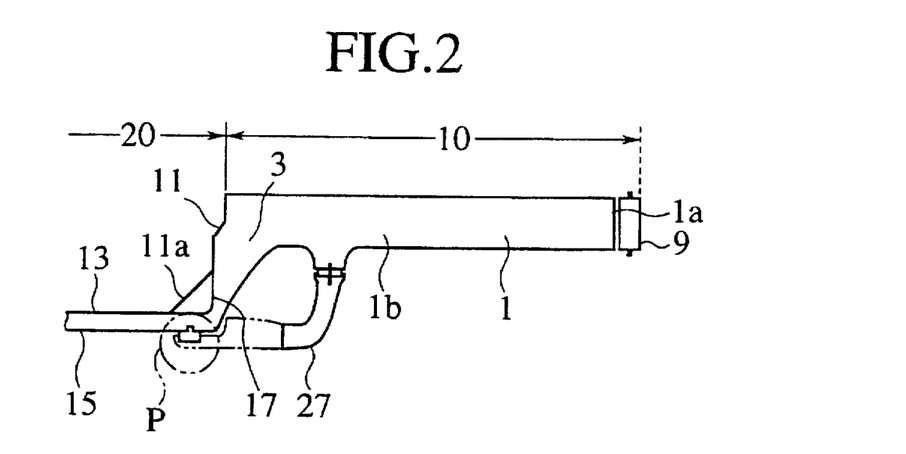
FIG. 2 is a side sectional view of FIG. 1.
Figure 3:
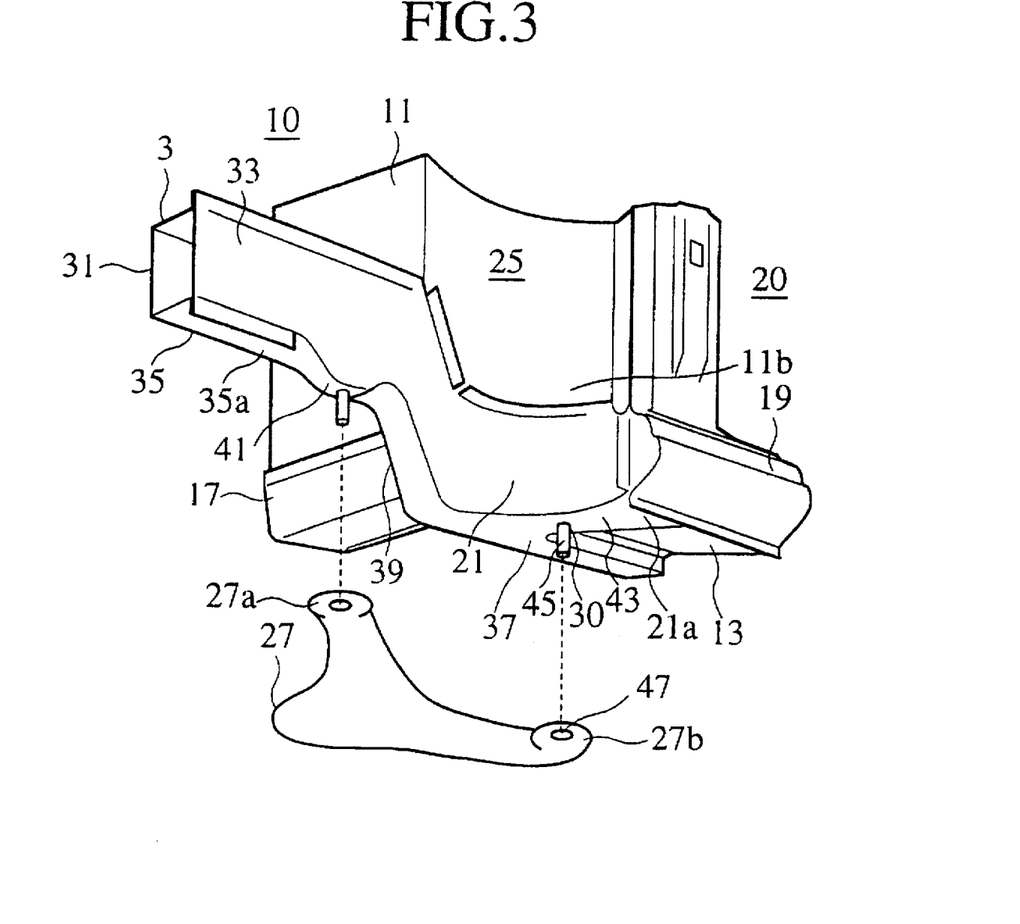
FIG. 3 is a perspective view of the main portion of FIG. 1.
Figure 4:
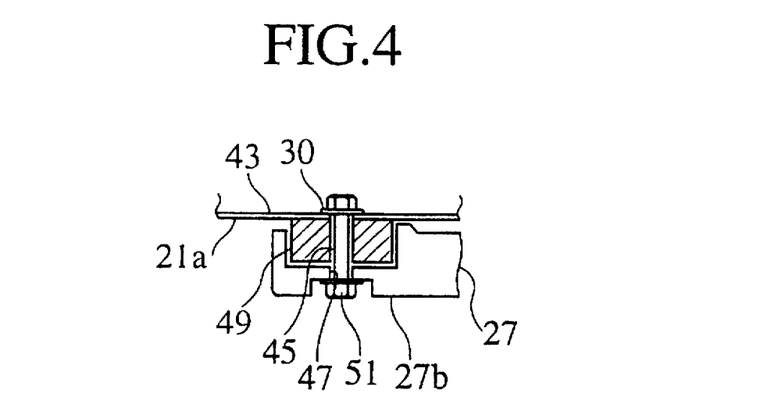
FIG. 4 is an enlarged view of the portion P in FIG. 2.

FIG. 1 is a bottom view of a vehicle having structural members according to the present embodiment, FIG. 2 is a side sectional view of FIG. 1, FIG. 3 is a perspective view of a main part of FIG. 1, and FIG. 4 is an enlarged view of the portion P in FIG. 2, respectively.

As shown in FIG. 1, on both sides in the car width direction of an engine room 10 in the front of a vehicle, there are provided right and left front side members 1 which are structural members. The right and left front side members 1 are formed into a closed section, and support a power unit 5 comprising an engine, a transmission and the like via a mount insulator 7. To the front end portions 1a of the front side members 1, there is provided a bumper 9, and to the rear end portions 1b, there are provided right and left extension sideframes 3 which are structural members integrally and continuously. These extension sideframes 3 extend from the engine room 10 to the lower side of a cabin 20.

As shown in FIG. 2, the front side members 1 are extended to roughly the same height with the bumper 9. The extension sideframes 3 are located in roughly the same height with the bumper 9 in the engine room 10, run against the dash panel 11 which divides the engine room 10 and the cabin 20, and after bending toward below along the dash panel 11, get under the lower side of the cabin 20, and extend along the lower face of the floor panel 13 connected to the dash panel 11. The rear of the vehicle of the extension sideframes 3 are extended toward the rear of the vehicle as the floor side member 15 which is the structural member. Also to the lower end corner portion 11a of the dash panel 11, there is connected a center member 17 which forms a closed section between the outer face of the dash panel 11 and itself.

As shown in FIG. 1, said center member 17 is provided along the vehicle width direction, and both end portions of the center member 17 run against the side portions of the extension sideframes 3 to be connected thereto. To the outside in the vehicle width direction of the extension sideframes 3, right and left sidesills 19 which are the structural members are extended rearward along the back and forth direction of the vehicle. Either of the sidesills 19 and said extension sideframe 3 is a structural member in a closed sectional form arranged in the back and forth direction of the vehicle, and the front end portion 19a of the sidesill 19 is coupled with the extension sideframe 3 via a torque box or coupling member 21. By this torque box 21, the rigidity of the extension sideframe 3 and the sidesill 19 are enhanced.

In the rear portion of the engine room 10, a suspension member 27 as a cross frame is arranged along the vehicle width direction, and a suspension (not shown) of front wheels 23 of the vehicle is supported by this suspension member 27. Below the dash panel 11, the rear end portions 27b as right and left end portions of the suspension member 27 are coupled to the rear coupling portion 43 as a frame coupling portion provided in the torque box 21 as a coupling member. The coupling point 30 with the suspension member 27 of the rear coupling portion 43 is located outside in the vehicle width direction than the center of a section (center of a sectional width) Me of the extension sideframe 3 and inside in the car width direction than the center of a section (center of the sectional width) Ms of the sidesill 19, and located ahead of the vehicle than the rear end 21b of the torque box 21.

As shown in FIG. 3, said torque box 21 is connected to the both end lower portions 11b in the car width direction of the dash panel 11 which forms the rear portion of the wheel house 25 of front wheels 23 (see FIG. 1) and forms a closed section between the dash panel 11 and itself.

The extension sideframe 3 has an upper horizontal portion 35 on said engine room 10 side, a lower horizontal portion 37 on said cabin 20 side and a bending portion 39 which continues from said upper horizontal portion 35 to said lower horizontal portion 37, and is formed in a roughly S-shape as seen from the car width direction. The upper horizontal portion 35 and the bending portion 39 have a main frame 31 having a section in a hat-like form and a panel frame 33 which closes the opening of the main frame 31, and are formed sectionally in a box-like form by the main frame 31 and the panel frame 33. To the bending portion 39, there are connected the center member 17 and the torque box 21. The lower horizontal portion 37 is formed sectionally in a hat-like form, and is connected to the floor panel 13 to form a closed section between the floor panel 13 and itself.

Said rear end portions 27b of the suspension member 27 are coupled to the rear coupling portions 43, as well as the front end portions 27a thereof are coupled to the front coupling portions 41. The front coupling portion 41 is projected to the lower face 35a of the upper horizontal portion 35 of the extension sideframe 3. The first coupling portions are laterally inwardly of the rear coupling portions 43.

A bolt 45 is projected to the coupling point 30 of the rear coupling portion 43, and a perforated hole 47 is formed in the rear end portion 27b of the suspension member 27. As shown in FIG. 4, the rear end portion 27b of the suspension member 27 is coupled to the rear coupling portion 43 by fastening a nut 51 to a bolt 45, and a rubber insulator 49 is provided between the rear end portion 27b of the suspension member 27 and the rear coupling portion 43. Furthermore, the front coupling portion 41 and the front end portion 27a become the same structure with that of the rear coupling portion 43 and the rear end portion 27b.

Next, the action will be described.

At the time of traveling of a vehicle, the load input to the suspension is received by the suspension member 27, which is supported by the extension sideframes 3.

At this time, a part of the load from the suspension is directly input to the torque box 21 from the suspension member 27, therefore the load from the suspension can be more securely supported.

At the time of a front-end collision of the vehicle, the bumper 9 first receives the input of the load. When such load becomes larger than a predetermined magnitude, the front side member 1 absorbs the load to cause a deformation, and the engine room 10 is crushed. When the engine room 10 is crushed to some extent, the power unit 5 retreats rearward of the vehicle to come in contact with the suspension member 27, and presses the suspension member 27 rearward of the vehicle.

At this time, the coupling point 30 of the rear coupling portion 43 of the suspension member 27 is located outside of the vehicle width than the center of a section Me of the extension sideframe 3 and inside in the vehicle width direction than the center of a section Ms of the sidesill 19, and is located ahead of the vehicle than the rear end 21b of the torque box 21. Namely, the load toward the rear of the vehicle affects both of them as a compressive load from a coupling point 30 between the extension sideframe 3 and the sidesill 19 which are the structural members. Therefore, the load affected to the coupling point 30 is efficiently dissipated and transmitted to the extension sideframe 3 and the sidesill 19 via the torque box 21. Thereby, the extension sideframe 3 and the sidesill 19 absorb the load to the rearward of the vehicle to reduce the deformation of the lower side of the calm 20 at the time of a front-end collision.

Figure 5:
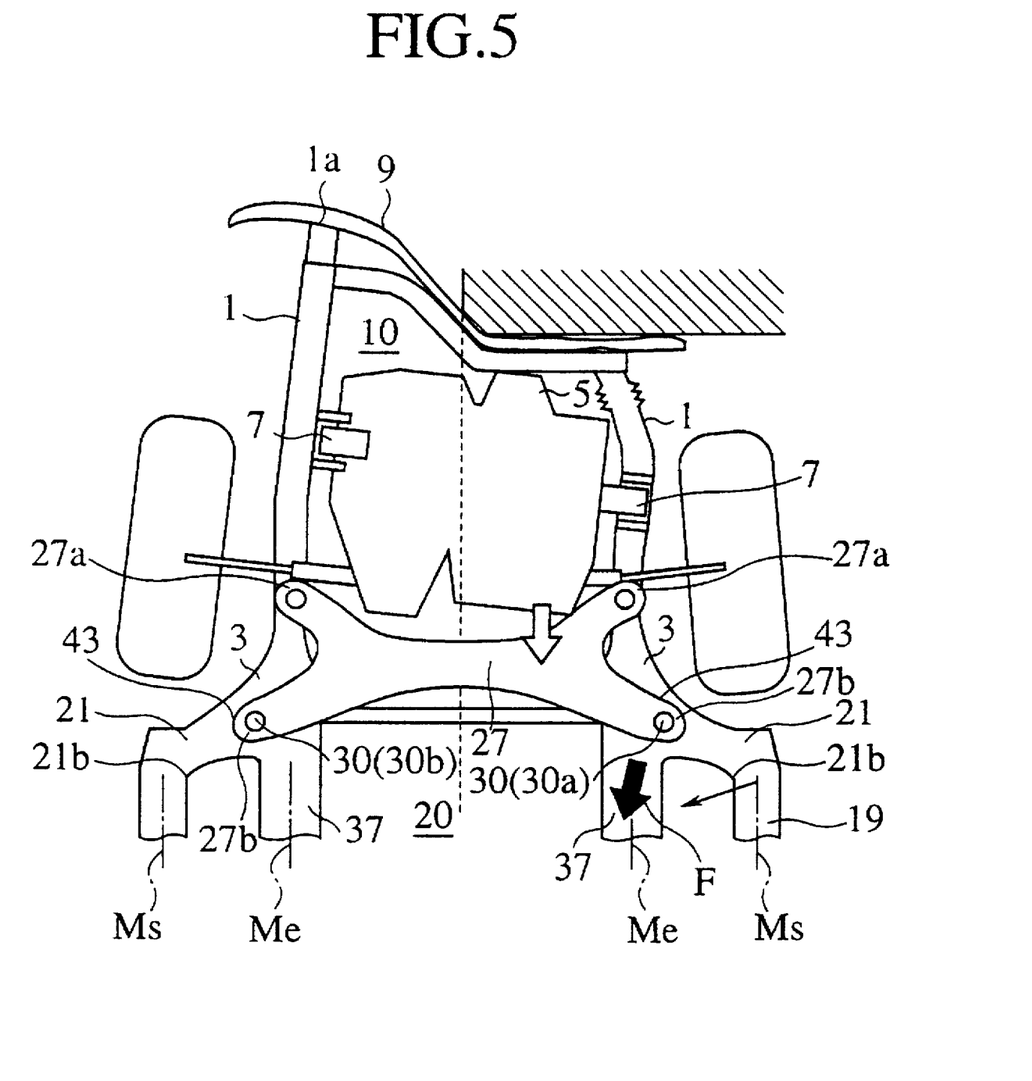
FIG. 5 is a bottom view showing the state at the time of a front-end offset collision in the first embodiment.

Furthermore, as shown in FIG. 5, at the time of a so-called front-end offset collision where the collision is biased to one end side in the front of the vehicle, the deformation is concentrated on the collision side of the engine room 10, and the power unit 5 comes in contact with the suspension member 27 while rotating, therefore, the rear end portion 27b (coupling point 30a) on the collision side of the suspension member 27 tends to retreat inside in the vehicle width direction so as to draw an arc making the coupling point 30b on the non-collision side as a center, as is shown by an arrow F in the drawing. Accordingly, the load in the diagonally rearward direction affects the coupling point 30a on the collision side, toward the inside in the vehicle width direction, but as at the time of said non-offset collision, the load imparted to the rear coupling portion 43 (coupling point 30a) is efficiently dissipated and transmitted to the extension sideframe 3 and the sidesill 19 via the torque box 21.

And by such load, the sidesill 19 located outside in the car width direction of the coupling point 30a receives the load in the flexural direction, but the extension sideframe 3 inside in the vehicle width direction of the coupling point 30a is located on the line of action of the load to share the compressive load, therefore the structure is made comprehensively to have high flexural rigidity by means of both the extension sideframe 3 and the sidesill 19.

Thereby, the extension sideframe 3 and the sidesill 19 absorb and support the load toward the rear direction of the vehicle, thus the deformation on the lower side of the cabin 20 can be reduced at the time of a front-end offset collision.

Therefore, the load at the time of the front-end collisions including offset collisions can be securely supported by the extension sideframe 3 and the sidesill 19 without making the structure heavy and complicated by providing a special reinforcing member, thickening the extension sideframe 3 or the like. Namely, the retreat of the suspension member 27 can be suppressed with a light and simple structure, to reduce the deformation on the lower side of the casing 20.

Furthermore, since a torque box 21 provided for increasing the rigidity of both the extension sideframe 3 and the sidesill 19 is used as a coupling member for coupling the extension sideframe 3 and the sidesill 19, no special coupling member is required, and the retreat of the suspension frame 27 can be suppressed with a simpler structure.

Next, the second embodiment according to claim 3 and claim 5 will be described.

Figure 6:
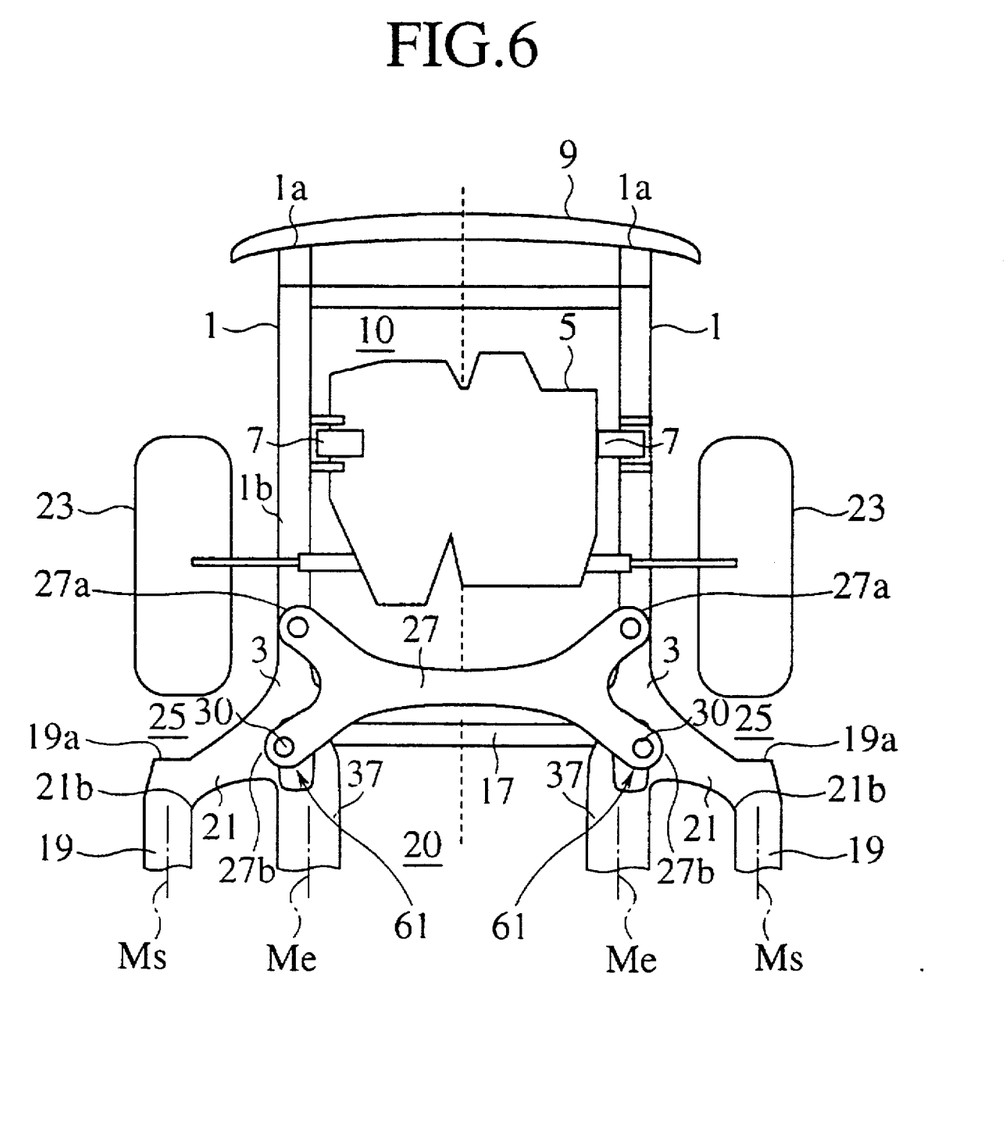
FIG. 6 is a bottom view of a vehicle having a structural member according to the second embodiment.
Figure 7:
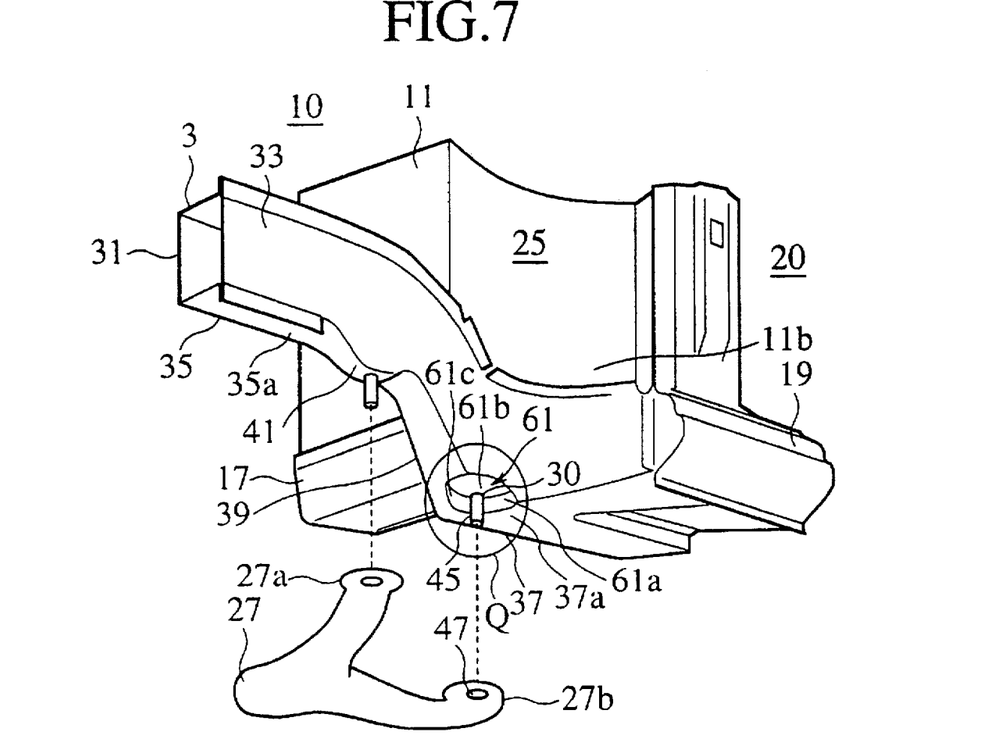
FIG. 7 is a perspective view of the main portion of FIG. 6.
Figure 8:
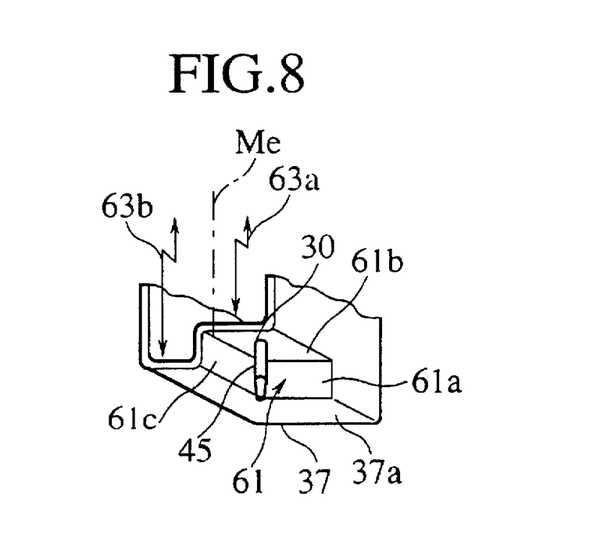
FIG. 8 is an enlarged view of the portion Q in FIG. 7.

FIG. 6 is a bottom view of a vehicle having structural members according to the present embodiment, FIG. 7 is a perspective view of a main part of FIG. 6, and FIG. 8 is an enlarged view of the portion Q in FIG. 7. The same reference numerals are given to the same constituents with the first embodiment, and the description thereof will be omitted.

As shown in FIG. 6 and FIG. 7, in the present embodiment, the rear coupling portion 61 is provided on the front end of the lower horizontal portion 37 of the extension sideframe 3. This rear coupling portion 61 is bent and so formed as to become hollow toward upward from the lower face 37a of the lower horizontal portion 37, and has an opposite face 61a which intersects with the back and forth direction of the vehicle body, a bottom face 61b bent roughly horizontally from the opposite face 61a, and a side face 61c which intersects with the vehicle width direction, and the front of the vehicle and the outside in the vehicle width direction are opened. Namely, as shown in FIG. 8, the side face along the vehicle width direction of the lower horizontal portion 37 including the rear coupling portion 61 is formed in a three-dimensional concave and convex shape such that the sectional height 63a in the height direction in the outside of the vehicle width direction becomes smaller than the sectional height 63b in the inside thereof. The coupling point 30 is located outside in the vehicle width direction than the center of a section Me of the lower horizontal portion 37, and in the bottom face 61b of the rear coupling portion 61 which is ahead of the vehicle than the rear end 21b of the torque box 21, and a bolt 45 is projected to the coupling point 30. Said opposite face 61a opposes the rear side portion of the rear end portion 27b in a state that the rear end portion 27b of the suspension member 27 is coupled to the rear coupling portion 61.

Next, the action will be described.

Figure 9:
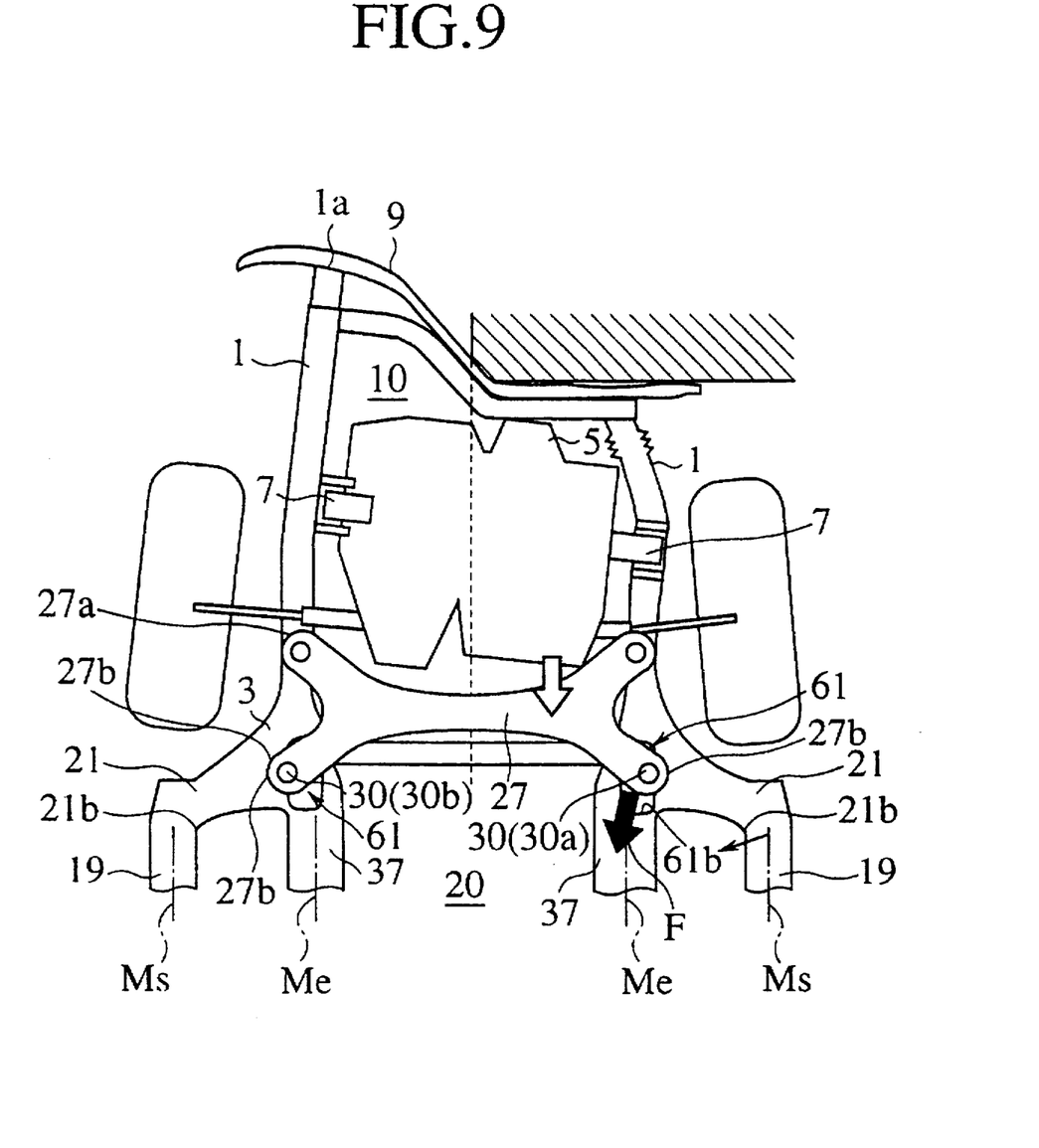
FIG. 9 is a bottom view showing the state at the time of a front-end offset collision in the second embodiment.

In the present embodiment, since the rear coupling portion 61 is provided in the lower horizontal portion 37 of the extension sideframe 3, in addition to the action and effect of said first embodiment, the distance between the coupling points 30 of the right and left rear coupling portions 61 can be suppressed to be small. Thereby, at the time of a front-end offset collision as shown in FIG. 9, in the event that the rear end portion 61 on the collision side (coupling point 30a) of the suspension member 27 tries to retreat toward the inside in the car width direction so as to draw an arc making the coupling point 30b on the non-collision side as a center, the moment affecting the rear coupling portion 61 on the collision side (coupling point 30a) can be suppressed to be low.

Furthermore, since the lower horizontal portion 37 provided with the rear coupling portion 61 and the sidesill 19 are coupled via the torque box 21, the coupling point 30 of the lower horizontal portion 37 and the torque box 21 can be provided closely to each other, and the transmission of the load from the coupling point 30 to the torque box 21 can be done more efficiently.

Furthermore, since the rear coupling portion 61 has an opposite face 61a, the retreat of the suspension member is received by the opposite face 61a. Therefore, the coupling point 30 is supported by both the strength in the back and forth direction of the extension sideframe and the strength of a section of the opposite face 61a, thereby the retreat of the suspension member 27 can be reduced further.

As described above, the retreat of the suspension member 27 can be suppressed to reduce the deformation on the lower side of the cabin 20 with a simple and light structure.

Next, the third embodiment according to claim 6 will be described.

Figure 10:
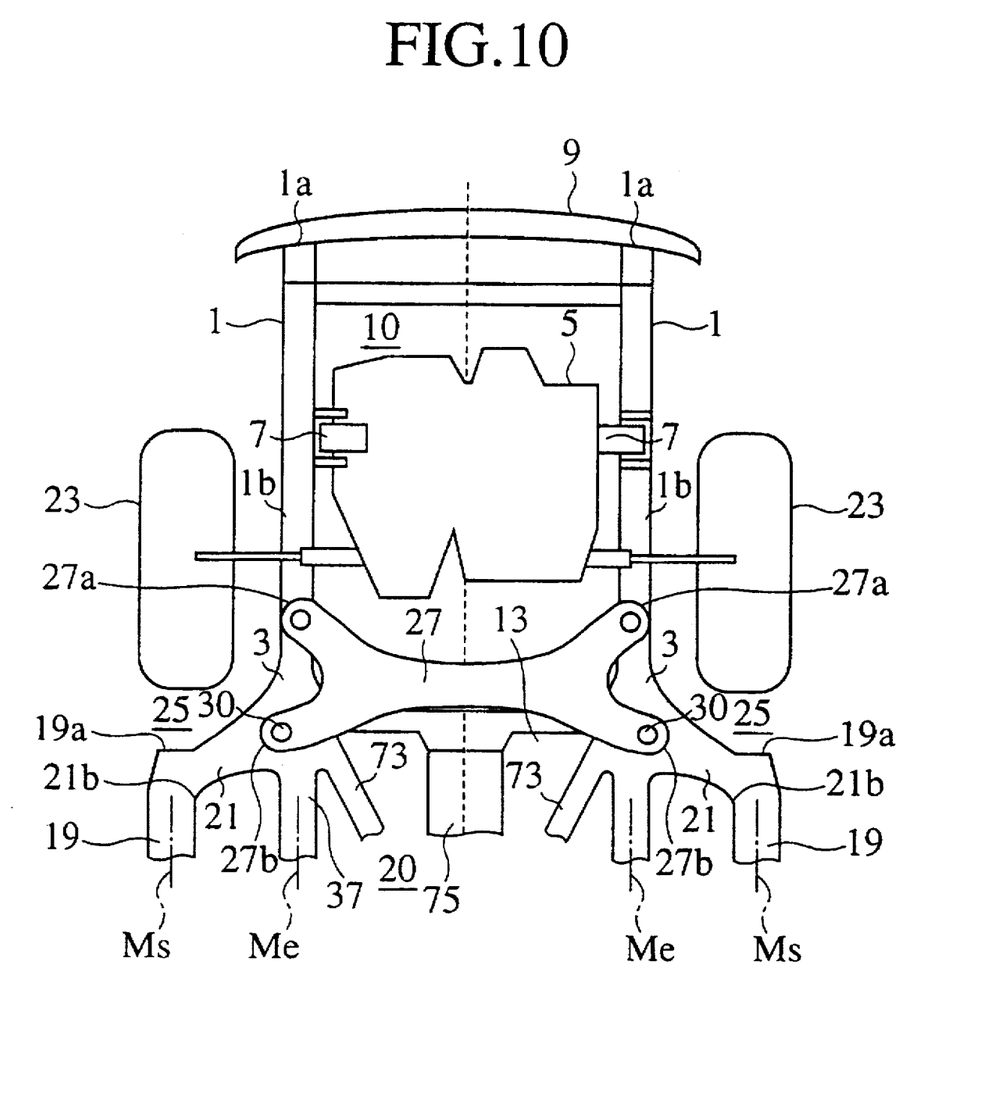
FIG. 10 is a bottom view of a vehicle having a structural member according to the third embodiment.
Figure 11:
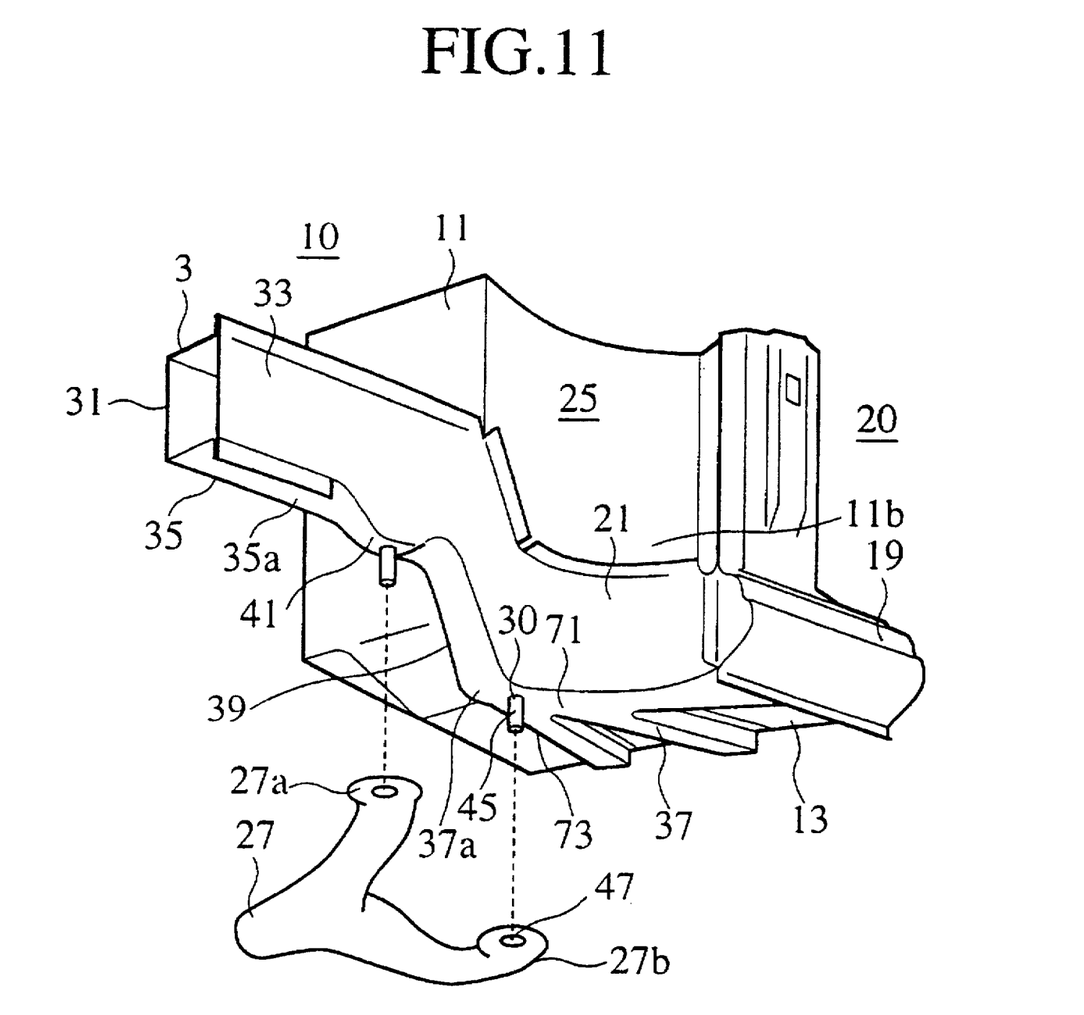
FIG. 11 is a perspective view of the main portion of FIG. 10.

FIG. 10 is a bottom view of a vehicle having structural members according to the present embodiment, FIG. 11 is a perspective view of a main part of FIG. 10, and the same reference numerals are given to the same constituents with the first embodiment, and the description thereof will be omitted.

As shown in FIG. 10 and FIG. 11, in the present embodiment, a rear coupling portion 71 is provided in the lower face 37a on the front end of the lower horizontal portion 37 of the extension sideframe 3. The coupling point 30 is located outside in the car width direction than the center of a section Me of the lower horizontal portion 37, and ahead of the vehicle than the rear end 21b of the torque box 21, and a bolt 45 is projected to the coupling point 30.

Furthermore, in the vicinity of the rear coupling portion 71 of the lower horizontal portion 37, there is connected a reinforcing member 73 in a hat-like shape in a section extending diagonally rearward toward the center of the car width. The reinforcing member 73 is connected to the lower face of the floor panel 13 to form a closed face between the floor panel 13 and itself. The front end of the reinforcing member 13 runs against the side portion inside in the car width direction of the lower horizontal portion 73 to be connected thereto.

Next, the action thereof will be described.

In the present embodiment, since the reinforcing member 73 extending diagonally rearward toward the center of the car width is connected in the vicinity of the rear coupling portion 71, a part of the load at the time of a front-end collision and a front-end offset collision of a vehicle is input to the reinforcing member 73. Therefore, since the load at the time of a collision is dissipated and transmitted to also the reinforcing member 73, the retreat of the suspension member 27 can be suppressed even by the reinforcing member 73.

Figure 12:
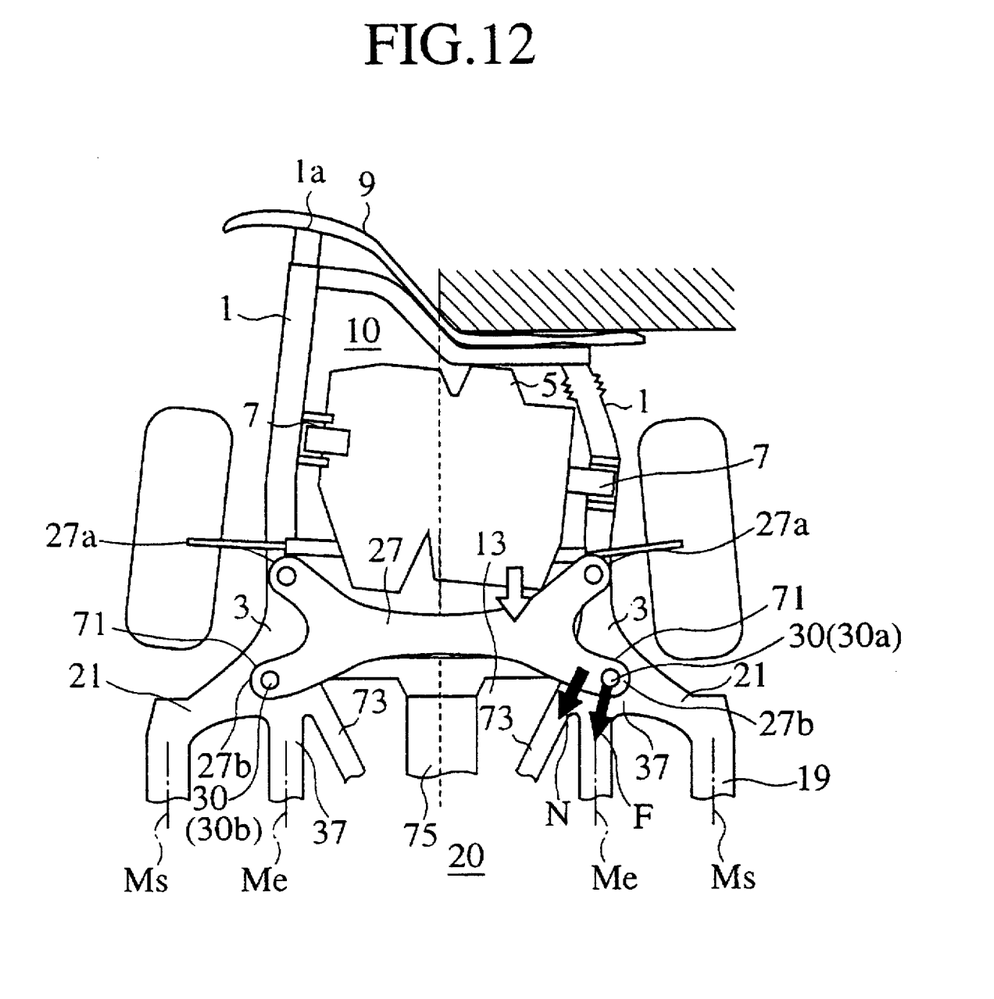
FIG. 12 is a bottom view showing the state at the time of a front-end offset collision in the third embodiment.

Particularly, at the time of a front-end offset collision as shown in FIG. 12, the input direction of the load to the coupling point 30a becomes diagonally rearward (the direction shown by an arrow F in the drawing) inside in the car width direction, but since the reinforcing member 73 is extended in the direction close to the input direction of the load (the direction shown by an arrow N in the drawing), the reinforcing member 73 receives the compressive load and supports it. Thereby, the load in the diagonally rearward direction inside in the car width direction can be dissipated and absorbed efficiently by the reinforcing member 73. Thus, by providing the reinforcing member 73, the retreat of the suspension member 27 can be suppressed more efficiently.

As described above, the retreat of the suspension member 27 can be suppressed to reduce the deformation on the lower side of the cabin 20 with a simple and light structure.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A structural member of a vehicle body, for distributing an impact load experienced by the vehicle in a front-end collision, comprising:

right and left extension sideframes extending from an engine room, where an engine is installed, to the lower side of a cabin;

right and left sidesills extending outwardly of said extension sideframes rearwardly of the vehicle;

coupling members for coupling said extension sideframes and said sidesills on right and left sides of a front portion of said cabin; and a cross frame having two rear end portions, arranged laterally between said extension sideframes, wherein said cross frame is arranged on a cabin side of said engine room so as to come into contact with said engine when a front-end of the vehicle collides and said engine retreats rearwardly of the vehicle body, both rear end portions of said cross frame are coupled to correspondingly located frame coupling portions provided in at least one of said extension sideframes, sidesills, or coupling members, and coupling points of said frame coupling portions for coupling thereat with said cross frame are laterally outwardly of the center of a section of said extension sideframes and laterally inwardly of the center of a section of said sidesills.

2. A structural member of a vehicle body according to claim 1, wherein:

said cross frame is a suspension member supporting a suspension of front wheels of the vehicle, said coupling members are torque boxes provided below a dash panel which divides said engine room and said cabin, and said frame coupling portions are provided in said torque boxes.

3. A structural member of a vehicle body according to claim 1, wherein:

said extension sideframe has an upper horizontal portion on a side of said engine room, a lower horizontal portion on a side of said cabin, and a bending portion which continues from said upper horizontal portion to said lower horizontal portion, said coupling member couples said lower horizontal portion and said sidesill, and said frame coupling portion is provided in the lower horizontal portion of said extension sideframe.

4. A structural member of a vehicle body according to claim 1, wherein:

a coupling point of said frame coupling portion is provided forwardly of a rear end of a corresponding coupling member.

5. A structural member of a vehicle body according to claim 1, wherein:

said frame coupling portion has an opposite face which intersects with a longitudinal direction of the vehicle body and opposes the rear side portions of both end portions of said cross frame.

6. A structural member of a vehicle body according to claim 1, wherein:

a reinforcing member extending diagonally rearward toward the lateral center of the vehicle is connected in the vicinity of the frame coupling portion of said extension sideframe.

7. A structural member of a vehicle body according to claim 1, wherein:

a rubber insulator is provided between said frame coupling portion and cross frame.

8. A structural member of a vehicle body according to claim 1, wherein:

front coupling portions coupled to both end portions of said cross frame in the front of said coupling points of said frame coupling portions are provided in said extension sideframe.

9. A structural member of a vehicle body according to claim 8, wherein:

said front coupling portions are laterally inwardly of said coupling points of said frame coupling portions.

10. A structural member of a vehicle body, comprising:

right and left extension sideframes longitudinally extending from an engine room, where an engine is installed, to the lower side of a cabin;

right and left sidesills positioned outwardly of said extension sideframes and extending rearwardly of a vehicle;

wherein said structural member comprises coupling members for coupling said extension sideframes and said sidesills on right and left sides of a front portion of said cabin; and a cross frame extending laterally between said extension sideframes, said cross frame being provided, at both lateral ends, with respective front and rear end portions, wherein said cross frame is arranged on a cabin side of said engine room so as to come into contact with said engine in the event the vehicle collides at a front-end and said engine subsequently retreats rearwardly, said front end portions of said cross frame are coupled to said side frames and said rear end portions are coupled to said coupling members, and coupling points of said frame coupling portions with said cross frame are positioned laterally outwardly of the center of a section of said extension sideframes and laterally inwardly of the center of a section of said sidewalls.

* * * * *